(12) United States Patent
Muramatsu et al.

(10) Patent No.: US 9,182,021 B2
(45) Date of Patent: Nov. 10, 2015

(54) ELECTRIC LINEAR MOTION ACTUATOR AND ELECTRIC DISK BRAKE SYSTEM

(75) Inventors: Makoto Muramatsu, Iwata (JP); Tatsuya Yamasaki, Iwata (JP); Masaaki Eguchi, Iwata (JP); Tomomi Goto, Iwata (JP)

(73) Assignee: NTN CORPORATION, Osaka (JP)

( * ) Notice: Subject to any disclaimer, the term of this patent is extended or adjusted under 35 U.S.C. 154(b) by 130 days.

(21) Appl. No.: 13/877,456

(22) PCT Filed: Oct. 17, 2011

(86) PCT No.: PCT/JP2011/073803
§ 371 (c)(1),
(2), (4) Date: Apr. 3, 2013

(87) PCT Pub. No.: WO2012/053469
PCT Pub. Date: Apr. 26, 2012

(65) Prior Publication Data
US 2013/0186717 A1    Jul. 25, 2013

(30) Foreign Application Priority Data

Oct. 20, 2010    (JP) .................. 2010-235613

(51) Int. Cl.
*F16H 25/12*    (2006.01)
*F16D 55/226*   (2006.01)
(Continued)

(52) U.S. Cl.
CPC .............. *F16H 25/12* (2013.01); *B60T 1/005* (2013.01); *B60T 13/741* (2013.01);
(Continued)

(58) Field of Classification Search
CPC ............ F16D 65/183; F16D 2125/48; F16D 2121/24; F16H 25/2454
USPC ............ 188/71.1–72.3, 72.7–72.9, 156–158; 74/89.39, 70, 412 R, 413, 414
See application file for complete search history.

(56) References Cited

U.S. PATENT DOCUMENTS

| | | |
|---|---|---|
| 5,310,026 A | 5/1994 | Shaw et al. |
| 8,485,054 B2 * | 7/2013 | Tateishi et al. ............... 74/89.39 |

(Continued)

FOREIGN PATENT DOCUMENTS

| | | |
|---|---|---|
| JP | 58-110343 | 6/1983 |
| JP | 2003-336672 | 11/2003 |
| JP | 2006-183809 | 7/2006 |
| JP | 2008-275053 | 11/2008 |
| JP | 2009156416 A * | 7/2009 |
| JP | 2010-065777 | 3/2010 |
| JP | 2010-090959 | 4/2010 |

OTHER PUBLICATIONS

International Search Report issued Nov. 8, 2011 in International (PCT) Application No. PCT/JP2011/073803.

(Continued)

*Primary Examiner* — Anna Momper
(74) *Attorney, Agent, or Firm* — Wenderoth, Lind & Ponack, L.L.P.

(57) ABSTRACT

A disk brake system includes a disk, brake pads, and a linear motion actuator including an electric motor, a rotary shaft coupled to the motor through a reduction gear mechanism, planetary rollers formed with helical grooves in their outer surfaces, and an outer ring member having a helical rib engaged in the helical grooves. The outer ring is coupled to one of the brake pads. When the rotary shaft is rotated by the motor, the outer ring member is moved axially through the planetary rollers, and the brake pads are pressed against the disk. The linear motion actuator further includes a locking mechanism including engaging holes formed in an intermediate gear of the reduction gear mechanism at equal intervals, a locking pin, and a linear solenoid for moving the locking pin until the pin engages in one of the engaging holes, thus locking the motor.

11 Claims, 10 Drawing Sheets

(51) Int. Cl.
*F16H 25/24* (2006.01)
*B60T 1/00* (2006.01)
*B60T 13/74* (2006.01)
*F16D 63/00* (2006.01)
*F16D 65/18* (2006.01)
*F16D 125/40* (2012.01)
*F16H 25/22* (2006.01)
*F16D 121/24* (2012.01)
*F16D 125/36* (2012.01)
*F16D 125/48* (2012.01)

(52) U.S. Cl.
CPC ............ *F16D 55/226* (2013.01); *F16D 63/006* (2013.01); *F16D 65/18* (2013.01); *F16H 25/2454* (2013.01); *F16D 2121/24* (2013.01); *F16D 2125/36* (2013.01); *F16D 2125/40* (2013.01); *F16D 2125/48* (2013.01); *F16H 25/2252* (2013.01); *Y10T 74/18704* (2015.01)

(56) References Cited

U.S. PATENT DOCUMENTS

2008/0264740 A1   10/2008   Usui
2010/0051395 A1*   3/2010   Sano et al. .................... 188/162
2011/0247904 A1   10/2011   Yamasaki
2013/0312555 A1*  11/2013   Yamasaki .................... 74/89.34

OTHER PUBLICATIONS

Written Opinion of the International Searching Authority issued Nov. 8, 2011 in International (PCT) Application No. PCT/JP2011/073803 (with English translation).

An Office Action issued Mar. 10, 2015 in corresponding Japanese Patent Application No. 2010-235613 (with partial English translation).

* cited by examiner

ELECTRIC LINEAR MOTION ACTUATOR AND ELECTRIC DISK BRAKE SYSTEM

TECHNICAL FIELD

This invention relates to an electric linear motion actuator for linearly driving a driven member such as brake pads, and an electric disk brake system including this electric linear motion actuator.

BACKGROUND ART

An electric linear motion actuator of this type includes a motion convertor mechanism which converts the rotary motion of the rotor shaft of an electric motor to a linear motion of an axially movable driven member.

Known motion convertor mechanisms used in this type of electric linear motion actuators include a ball-screw mechanism and a ball-ramp mechanism. These motion convertor mechanisms can increase power to some extent but cannot increase power to such an extent as required in an electric disk brake system.

Thus in an electric linear motion actuator using one of the above-mentioned motion convertor mechanisms, a reduction mechanism such as a planetary gear mechanism is additionally provided to increase driving force. Such a separate reduction mechanism adds to the complexity and the size of the electric linear motion actuator.

The applicant of the present invention has already proposed in JP 2010-65777A and JP 2010-90959A electric linear motion actuators which are free of this problem, and which can sufficiently increase power without the need for a separate reduction mechanism and thus can be used in an electric disk brake system, of which the linear motion stroke is relatively small.

The electric linear motion actuator disclosed in either of JP 2010-65777A and JP 2010-90959A includes a rotary shaft rotated by an electric motor, an axially movably supported outer ring member, and planetary rollers mounted between the rotary shaft and the outer ring member. A helical rib is formed on the radially inner surface of the outer ring member which is engaged in helical grooves or circumferential grooves formed on the radially outer surfaces of the respective planetary rollers. Thus when the rotary shaft rotates, the planetary rollers revolve around the rotary shaft while rotating about their respective axes due to contact friction between the planetary rollers and the rotary shaft, and simultaneously, the outer ring member is moved in the axial direction.

If the electric linear motion actuator disclosed either JP 2010-65777A or JP 2010-90959A is used in an electric disk brake system, such a disk brake system has the function as the service brake only, i.e. the brake which can only control the braking force according to the force applied to the brake pedal by a driver. In order to keep the vehicle parked in position, it is necessary to keep the electric motor energized while the vehicle is being parked, which is a huge waste of electric energy.

JP 2006-183809A proposes an electric brake system which includes a parking brake locking mechanism which, when actuated, is adapted to stop rotation of the rotor of the electric motor in the brake releasing direction. This almost completely eliminates the disadvantages of the above-mentioned disk brake system.

While the electric brake system disclosed in JP 2006-183809A has the parking brake locking mechanism, since this locking mechanism is mounted around the rotor, the brake system tends to be large in diameter, so that the brake system could interfere with a wheel when mounted on a vehicle.

Also, since the parking brake locking mechanism is mounted around the rotor, it adds to the weight of the electric motor, resulting in a weight imbalance of the entire brake system, which could detrimentally influence how the brake pads are pressed against the brake disk during braking, thus destabilizing the braking operation. This could cause brake squeak.

In the electric brake system disclosed in JP 2006-183809A, various components of the parking brake locking mechanism, such as a pivot arm with a claw, a solenoid for pivoting the pivot arm and a torsion return spring for the pivot arm, are formed into a module so that these components can be easily mounted on the brake system. A rigid protective cover is necessary to protect this module against e.g. flying stones while the vehicle is traveling.

SUMMARY OF THE INVENTION

An object of the invention is to provide an electric linear motion actuator which includes a locking mechanism capable of selectively locking and unlocking the rotation of the rotor shaft of the electric motor and which is small in size and well balanced in weight distribution, and an electric disk brake system including this electric linear motion actuator.

In order to achieve this object, the present invention provides an electric linear motion actuator comprising an electric motor having a rotor shaft, a reduction gear mechanism including an output gear having a center axis for reducing a rotation of the rotor shaft of the electric motor and outputting the thus reduced rotation at the output gear, a slide member movable in a direction of the center axis of the output gear, a rotation-to-linear-motion converting mechanism for converting a rotary motion of the output gear of the reduction gear mechanism to a linear motion and transmitting the linear motion to the slide member, and a locking mechanism capable of selectively rotationally locking and unlocking the rotor shaft of the electric motor, wherein the locking mechanism comprises a plurality of engaging portions provided on one side of one of a plurality of gears forming the reduction gear mechanism so as to be arranged in a circumferential direction of the one of the plurality of gears, a locking pin movable toward and away from the engaging portions and configured to be brought into engagement with any one of the engaging portions when moved toward the engaging portions, thereby locking the gears of the reduction gear mechanism, and a pin driving actuator for moving the locking pin between an advanced position and a retracted position, the pin driving actuator being mounted between the electric motor and a housing in which the slide member and the rotation-to-linear-motion-converting mechanism are mounted.

The present invention also provides a disk brake system comprising brake pads, a brake disk, and an electric linear motion actuator for linearly driving one of the brake pads, thereby pressing the brake pads against the brake disk, and imparting a braking force to the brake disk, wherein the electric linear motion actuator is the electric linear motion actuator according to the present invention, and wherein the one of the brake pads is coupled to the slide member of the electric linear motion actuator.

In this electric disk brake system, when the electric motor of the electric linear motion actuator is activated, the rotation of the rotor shaft of the electric motor is reduced by the reduction gear mechanism and outputted from the output gear. The rotation of the output gear is then converted to a linear motion by the rotation-to-linear-motion converting mechanism, and transmitted to the slide member. The slide member is thus advanced, pressing the brake pad coupled to the slide member against the brake disk, thus applying a braking force to the brake disk.

When parking the vehicle equipped with this brake system, with the brake pads pressed against the brake disk in the above manner such that a braking force necessary to keep the vehicle parked is applied to the brake disk, the locking pin is advanced by the pin driving actuator until the locking pin is engaged in one of the engaging portions, thus locking the gears. With the gears locked in position, the electric motor is deactivated, thereby saving electric energy during parking.

With the locking pin engaged in one of the engaging portions, i.e. with the rotor shaft of the electric motor locked in position, torque is applied to the respective gears forming the reduction gear mechanism that tends to release the brake, due to the reaction force from the brake disk. This torque acts on the portions of the locking pin and one of the engaging portions that are in engagement with each other. This torque is large at the output gear and decreases gradually toward the input gear.

Thus, if the locking mechanism, including the locking pin and the engaging portions, is located close to the output gear, relatively large torque acts on the engaged portions of the locking pin and one of the engaging portions. If the engaged portions are not sufficient in strength, such large torque could cause deformation of the engaged portions. One way to prevent such deformation would be to increase the rigidity and thus the strength of the engaged portions. But this solution increases the weight of the electric linear motion actuator.

To avoid this problem, the engaging portions are preferably provided on one side of a gear other than the output gear. More preferably, the engaging portions are provided on a gear located close to an input gear mounted on the rotor shaft of the electric motor.

The engaging portions may be engaging holes extending through the one of the plurality of gears, or may be radial grooves formed on the one side of the one of the plurality of gears. Since the engaging portions are circumferentially spaced from each other, when the locking pin is advanced toward the gear by the pin driving actuator, the locking pin may not be aligned with and thus cannot engage any of the engaging portions. In such a case, with the locking pin advanced, the electric motor is driven to rotate the gear in the braking direction until the locking pin aligns with and engages in one of the engaging portions.

In the arrangement in which the engaging portions are the engaging holes, the engaging holes may each be formed with a locking surface provided at one circumferential end of the engaging hole and configured such that when the locking pin engages the locking surface, the locking surface prevents the one of the plurality of gears from rotating in the brake releasing direction (i.e. the direction in which the slide member moves backward), and a tapered surface provided at the other circumferential end of the engaging hole and configured such that when the one of the plurality of gears tends to rotate in the braking direction (i.e. the direction in which the slide member is advanced), the locking pin is allowed to separate from the engaging hole while sliding along the tapered surface. With this arrangement, the gear can be smoothly rotated in the braking direction, thus making it possible to apply a pressing force to the brake disk which is necessary to keep the vehicle parked in position.

In the arrangement in which the engaging portions are the radial grooves, the radial grooves are preferably each formed with a locking surface provided at one circumferential side of the radial groove and configured such that when the locking pin engages the locking surface, the locking surface prevents the one of the plurality of gears from rotating in the brake releasing direction (direction in which the slide member moves backward), and a tapered surface provided at the other circumferential side of the radial groove and configured such that when the one of the plurality of gears tends to rotate in the braking direction (direction in which the slide member is advanced), the locking pin is allowed to separate from the radial groove while sliding along the tapered surface. With this arrangement, the gear can be smoothly rotated in the braking direction, thus making it possible to apply a pressing force to the brake disk which is necessary to keep the vehicle parked in position.

In either of the above two arrangements, the locking mechanism preferably further includes an elastic member biasing the locking pin toward the one of the plurality of gears so that the locking pin can be reliably engaged in one of the engaging portions.

By using a linear solenoid as the pin-driving actuator, it is possible to reduce the size of the electric linear motion actuator according to the present invention.

The rotation-to-linear-motion converting mechanism may comprise a rotary shaft supporting the output gear of the reduction gear mechanism, the above-described slide member, which is in the form of an outer ring member slidably supported by the housing so as to be coaxial with the rotary shaft, a carrier rotatable about the rotary shaft, and planetary rollers rotatably supported by the carrier between the radially outer surface of the rotary shaft and the radially inner surface of the outer ring member, wherein a helical groove or circumferential grooves are formed on the radially outer surface of each of the planetary rollers, wherein a helical rib is formed on the radially inner surface of the outer ring member which is engaged in the helical grooves or circumferential grooves of the planetary rollers, whereby the outer ring member as the slide member is moved in the direction of the center axis of the output gear when the planetary rollers rotate due to contact friction between the rotary shaft and the planetary rollers.

Alternatively, the rotation-to-linear-motion converting mechanism may comprise a rotary shaft supporting the output gear of the reduction gear mechanism and formed with a helical rib on the radially outer surface of the rotary shaft, the above-mentioned housing, which is a cylindrical member located coaxial with the rotary shaft, and the above-mentioned slide member, which is in the form of a plurality of planetary rollers mounted between the radially inner surface of the housing and the radially outer surface of the rotary shaft and each formed with circumferential grooves on the radially outer surface of the planetary roller with the same pitch as the helical rib of the rotary shaft, the helical rib being engaged in the circumferential grooves, whereby the rotation-to-linear-motion converting mechanism converts the rotary motion of the rotary shaft to a linear motion of the planetary rollers, as the slide member, due to engagement between the circumferential grooves and the helical rib.

In the electric linear motion actuator according to the present invention, it is possible to lock the rotor shaft of the electric motor by actuating the pin-driving actuator to advance the locking pin until it is engaged in one of the engaging portions formed on one side of one of the gears of the reduction gear mechanism, thereby stopping the rotation of the gears. This makes it possible to lock the slide member after axially moving the slide member to any desired position. By using this electric linear motion actuator in an electric disk brake system, while the vehicle is being parked, it is possible to keep the brake pads pressed against the brake disk with a necessary force without the need to keep the electric motor energized.

Since the locking pin is movable toward and away from the engaging portions formed on one side of the gear, and the pin-driving actuator for moving the locking pin toward and away from the engaging portions is mounted between the electric motor and the housing in which the slide member and the rotation-to-linear-motion converting mechanism are mounted, the electric motor and the housing have smaller diameters, so that the entire electric linear motion actuator is sufficiently small in size.

Since the pin-driving actuator is mounted between the electric motor and the housing in which the slide member is mounted, good weight balance is maintained, which stabilizes braking operation. Since the pin-driving actuator is protected by the electric motor and the housing too, its protective cover may be a simple one.

DETAILED DESCRIPTION OF THE INVENTION

Figure 1:
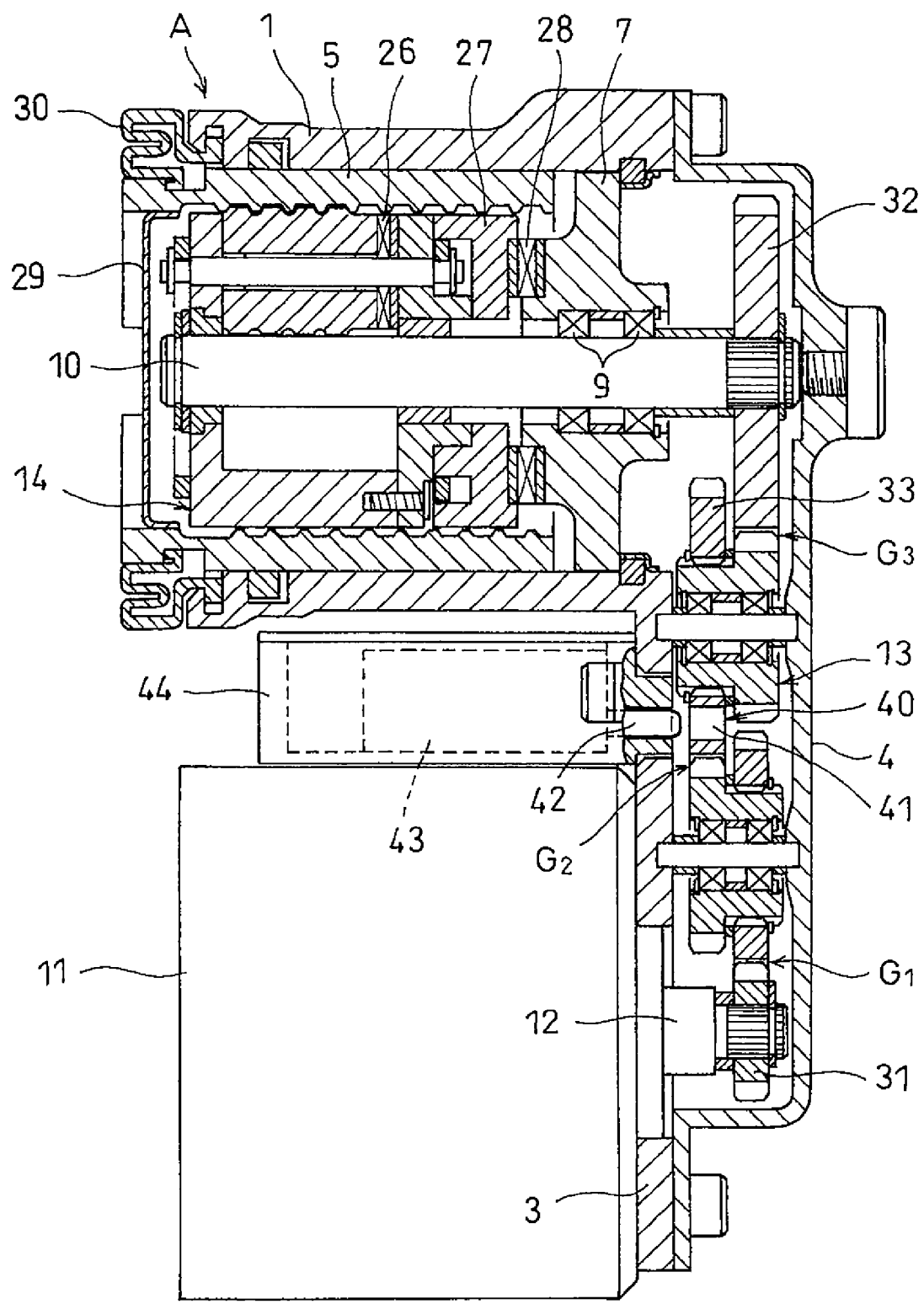
FIG. 1 is a vertical sectional view of an electric linear motion actuator embodying the present invention.

The embodiment of this invention is now described with reference to the drawings. FIGS. 1 to 5(b) show an electric linear motion actuator A according to the present invention. As shown in FIG. 1, the actuator A includes a cylindrical housing 1 having a base plate 3 radially outwardly extending from a first end of the housing 1, and a cover 4 covering the outer side surface of the base plate 3 and an opening of the housing 1 at the first end of the housing 1.

Figure 2:
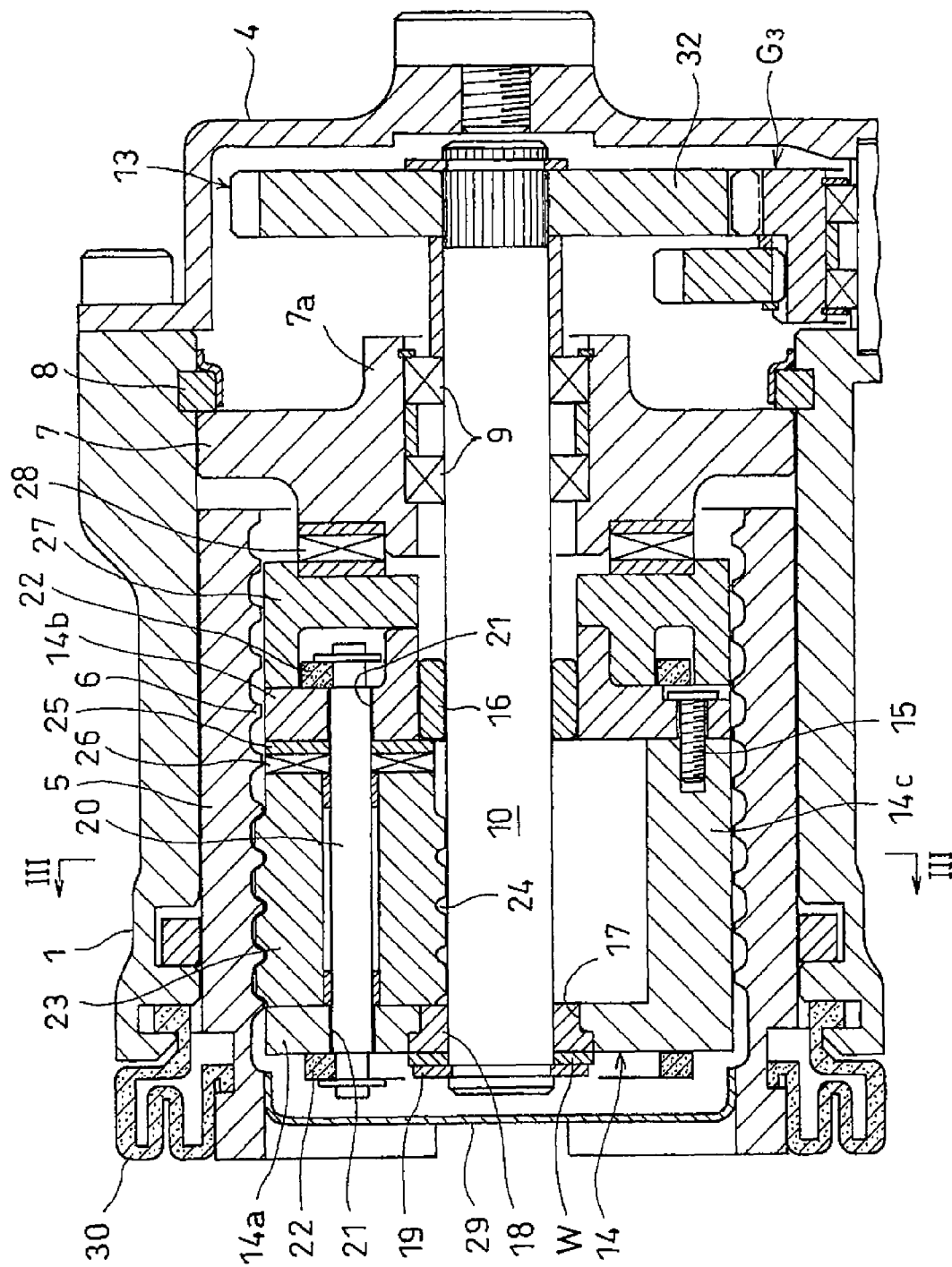
FIG. 2 is a partial enlarged sectional view of FIG. 1.

An outer ring member 5 as a slide member is mounted in the housing 1. The outer ring member 5 is rotationally fixed but axially movable along the radially inner surface of the housing 1. As shown in FIG. 2, a helical rib 6 having a V-shaped section is formed on the radially inner surface of the outer ring member 5.

A bearing member 7 is mounted in the housing 1 to face a first axial end of the outer ring member 5. The bearing member 7 is a disk-shaped member having a boss 7a at its center. A stopper ring 8 mounted to the radially inner surface of the housing 1 prevents the bearing member 7 from moving toward the cover 4.

Two rolling bearings 9 are mounted in the boss 7a of the bearing member 7 so as to be axially spaced from each other. The rolling bearings 9 rotatably support a rotary shaft 10 extending along the center axis of the outer ring member 5.

As shown in FIG. 1, an electric motor 11 having a rotor shaft 12 is supported by the base plate 3. The rotation of the rotor shaft 12 of the motor 11 is transmitted to the rotary shaft 10 through a reduction gear mechanism 13 mounted in the cover 4.

Figure 3:
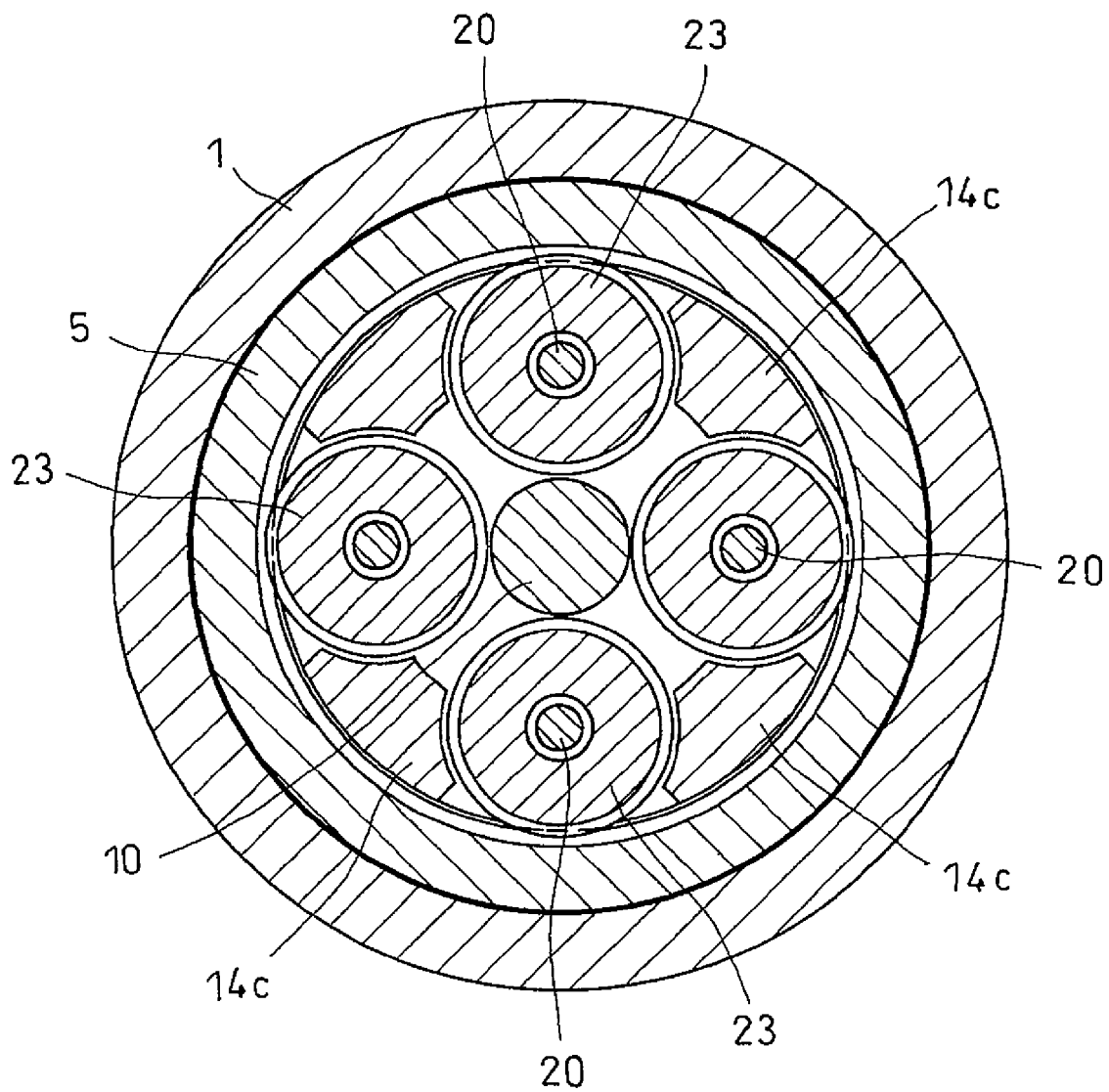
FIG. 3 is a sectional view taken along line III-III of FIG. 2.

A carrier 14 is mounted in the outer ring member 5 so as to be rotatable about the rotary shaft 10. As shown in FIGS. 2 and 3, the carrier 14 includes two axially opposed disks 14a and 14b. The disk 14a has a plurality of circumferentially spaced apart spacer members 14c extending from the radially outer portion of the side of the disk 14a toward the other disk 14b. The disks 14a and 14b are coupled together by tightening screws 15 threaded into the end surfaces of the respective spacer members 14c.

The inner one 14b of the disks 14a and 14b, which is located close to the bearing member 7, is rotatably and axially slidably supported by a slide bearing 16 mounted between the disk 14b and the rotary shaft 10.

A shaft inserting hole 17 (stepped hole) is formed in the center of the outer disk 14a. A slide bearing 18 fitted in the shaft inserting hole 17 is rotatably supported by the rotary shaft 10. A metal washer W is fitted on the rotary shaft 10 adjacent to the outer end surface of the slide bearing 18 to support thrust loads. A snap ring 19 is mounted to the end of the rotary shaft 10 to prevent separation of the washer W.

The carrier 14 includes a plurality of circumferentially spaced apart roller shafts 20 having first and second axial ends thereof supported by the respective disks 14a and 14b. In particular, the roller shafts 20 have their first and second axial ends received in elongated shaft inserting holes 21 formed in the respective disks 14a and 14b so as to be radially movable. Elastic rings 22 are each wrapped around the first or second axial ends of the roller shafts 20, biasing the roller shafts 20 radially inwardly.

Planetary rollers 23 are mounted between the radially outer surface of the rotary shaft 10 and the radially inner surface of the outer ring member 5, while being rotatably supported by the respective roller shafts 20. The planetary rollers 23 are thus pressed against the radially outer surface of the rotary shaft 10 by the elastic rings 22, which are wrapped around the respective first and second axial ends of the roller shafts 20, such that the radially outer surfaces of the planetary rollers 23 are kept in elastic contact with the radially outer surface of the rotary shaft 10. Thus, when the rotary shaft 10 rotates, the planetary rollers 23 also rotate due to contact friction between the planetary rollers and the radially outer surface of the rotary shaft 10.

As shown in FIG. 2, a plurality of helical grooves 24 having a V-shaped section are formed in the radially outer surface of each planetary roller 23 at equal axial intervals and with the same pitch as the helical rib 6 of the outer ring member 5. The helical rib 6 is engaged in the helical grooves 24. Instead of the helical grooves 24, a plurality of axially equidistantly spaced apart circumferential grooves may be formed in the radially outer surface of each planetary roller with the same pitch as the helical rib 6.

As shown in FIG. 2, a washer 25 and a thrust bearing 26 are mounted between the axially opposed surfaces of the inner disk 14b of the carrier 14 and each planetary roller 23. An annular thrust plate 27 is mounted between the axially opposed surfaces of the carrier 14 and the bearing member 7. A thrust bearing 28 is mounted between the thrust plate 27 and the bearing member 7.

As shown in FIG. 2, the opening of the outer ring member 5 at the second end thereof, which protrudes from the opening of the housing 1 at its second end, is closed by a seal cover 29, preventing entry of foreign matter into the device.

A bellows 30 has one end thereof coupled to the opening of the housing 1 at the second end thereof, and the other end to second end of the outer ring member 5, preventing entry of foreign matter into the housing 1.

Figure 4:
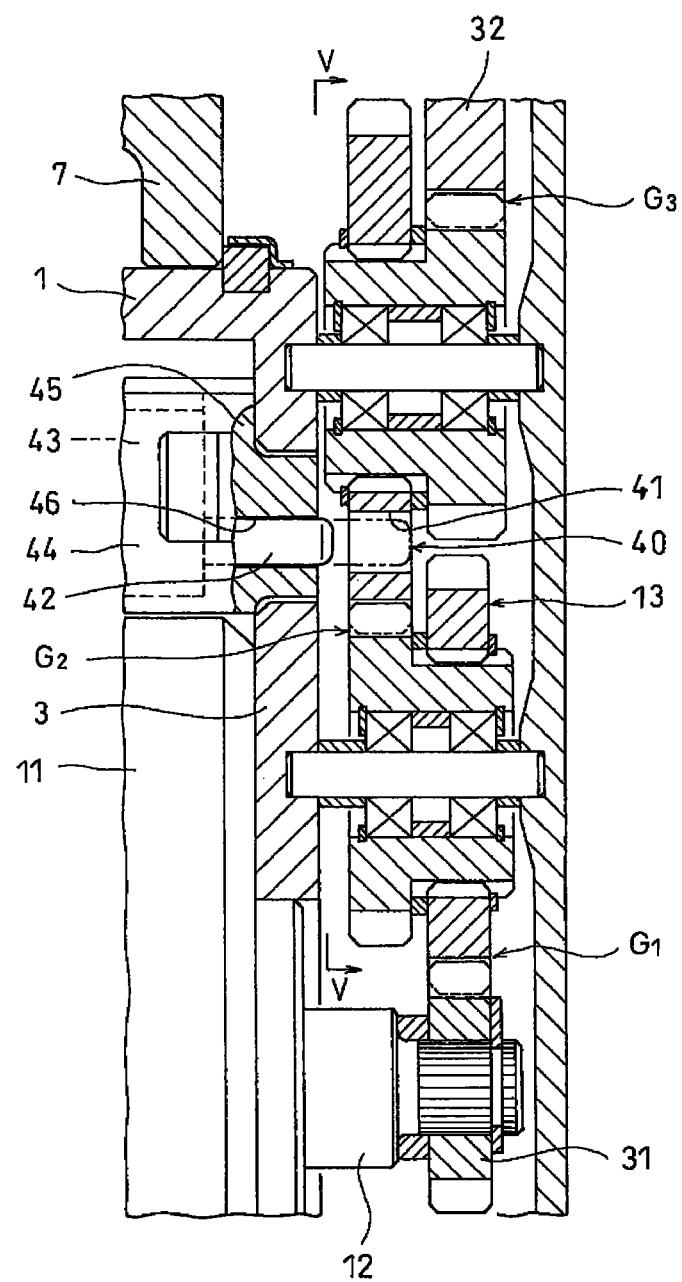
FIG. 4 is an enlarged sectional view of a reduction gear mechanism of FIG. 1.

As shown in FIGS. 1 and 4, the reduction gear mechanism 13 includes first to third reduction gear trains G1 to G3. The rotation of an input gear 31 mounted to the rotor shaft 12 of the electric motor is reduced in a stepwise manner by the respective first to third reduction gears G1 to G3 and transmitted to an output gear 32 mounted to the end of the rotary shaft 10 to rotate the rotary shaft 10. The reduction gear mechanism 13 further includes a locking mechanism 40 capable of selectively locking and unlocking the rotor shaft 12 of the electric motor 11.

Figure 5A:
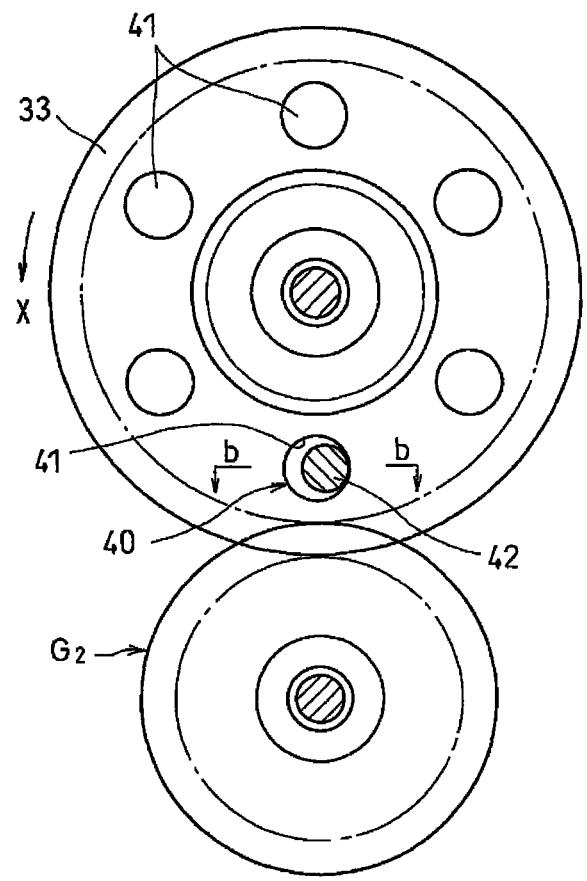
FIG. 5(a) is a sectional view taken along line V-V of FIG. 4.
Figure 5B:
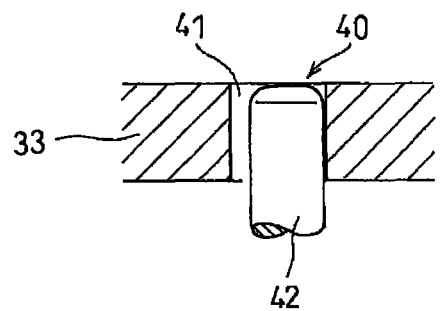
FIG. 5(b) is a sectional view taken along line b-b of FIG. 5(a).

As shown in FIGS. 4, 5(a) and 5(b), the locking mechanism 40 includes a plurality of engaging holes 41 formed in one side of an intermediate gear 33 of the second gear train G2, which is located on the output side of the gear train G2, so as to be arranged on a common circle at equal angular intervals, a locking pin 42 movable toward and away from a point on the pitch circle of the engaging holes 41, and a linear solenoid 43 as an actuator for driving the locking pin 42, whereby when the locking pin 42 is engaged in one of the engaging holes 41, the intermediate gear 33 is locked.

The solenoid 43 is protected by a protective cover 44. The protective cover 44 is supported by the base plate 3 and disposed between the housing 1 and the electric motor 11. The protective cover 44 has a front plate 45 formed with a pin hole 46 in which the locking pin 42 is slidably received.

Figure 9:
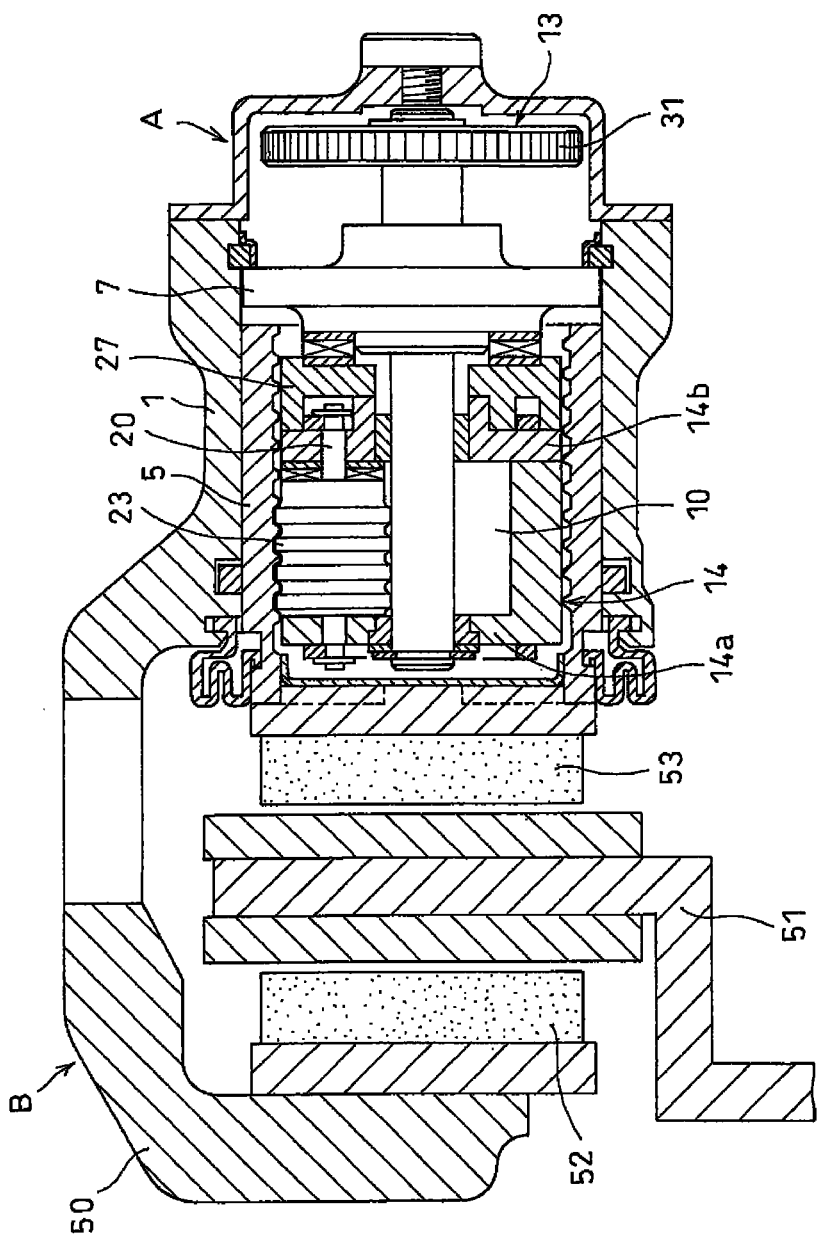
FIG. 9 is a vertical sectional view of an electric disk brake system embodying the present invention.

FIG. 9 shows an electric disk brake system B in which the electric linear motion actuator A of the above-described embodiment is mounted. This brake system includes a caliper body portion 50 which is integrally connected to the second end of the housing 1, a brake disk 51 provided such that its radially outer portion extends into the interior of the caliper body portion 50, a fixed brake pad 52, and a movable brake pad 53 fixedly coupled to the second end of the outer ring member 5.

Now the operation of the electric disk brake system B of FIG. 9, which includes the linear motion actuator A, is described. When the electric motor, shown in FIG. 1, is driven, the rotation of the rotor shaft 12 of the electric motor 11 is reduced in speed by the reduction gear mechanism 13 and transmitted to the rotary shaft 10.

Since the radially outer surfaces of the plurality of planetary rollers 23 are kept in elastic contact with the radially outer surface of the rotary shaft 10, when the rotary shaft 10 rotates, the planetary rollers 23 revolve around the rotary shaft 10 while rotating about their own axes due to contact friction between the planetary rollers 23 and the rotary shaft 10.

At this time, since the helical rib 6 formed on the radially inner surface of the outer ring member 5 is engaged in the helical grooves 24 formed in the radially outer surfaces of the respective planetary rollers 23, the outer ring member 5 moves in the axial direction, thus pressing the movable brake pad 53, which is fixedly coupled to the outer ring member 5, against the brake disk 51, thus applying a braking force to the brake disk 51.

While the vehicle in which this brake system is mounted is parked, with the movable brake pad 53 pressed against the brake disk 51 such that a braking force necessary to keep the vehicle parked in position is applied to the brake disk 51, the linear solenoid 43 is activated to advance the locking pin 42 toward the side surface of the intermediate gear 33.

If, when the locking pin 42 is advanced, the locking pin 42 is aligned with one of the plurality of engaging holes 41, as shown in FIGS. 5(a) and 5(b), the locking pin 42 is engaged in this hole 41 and the intermediate gear 33 is locked, so that the rotor shaft 12 of the electric motor 11 is also locked. Thus the electric motor 11 can be kept deactivated, so that no electric power is consumed during parking.

If, when the locking pin 42 is advanced, the locking pin 42 is aligned with none of the engaging holes 41, the locking pin 42 can engage in none of the engaging holes 41. In such a case, with the locking pin 42 kept in its advanced position, the electric motor 11 is driven to rotate the intermediate gear 33 in the direction in which a braking force increases (shown by the arrow X in FIG. 5(a)) until one of the engaging holes 41 aligns with the locking pin 42, thereby allowing the locking pin 42 to be engaged in the one of the engaging holes 41.

Once the locking pin 42 engages in one of the engaging holes 41, thereby locking the intermediate gear 33, as well as the rotor shaft 12 of the electric motor 11, the reaction force from the brake disk 51 acts on the respective gears as torque that tends to counteract the braking force. This torque is applied to the engaging portion between the engaging hole 41 and the locking pin 42. This torque is large at the output gear 32 and gradually decreases toward the input gear 31.

In the embodiment, since the plurality of engaging holes 41 are formed in the side surface of the intermediate gear 33 of the second reduction gear train G2, which is on the output side of the gear train G2, torque applied to the engaging portion between the engaging hole 41 and the locking pin 42 is relatively small, so that this engaging portion is never damaged.

But to more positively prevent damage to the engaging portion, the engaging holes 41 are preferably formed in an intermediate gear located as close to the input gear 31 as possible, with the locking pin 42 provided at a position corresponding to the engaging holes 41.

In the embodiment of FIG. 1, since the linear solenoid 43 of the locking mechanism 40 for driving the locking pin is provided between housing 1 and the electric motor 11, the diameters of the housing 1 and the electric motor 11 are both relatively small, so that the entire electric linear motion actuator A is also compact in size.

Also, since the linear solenoid 43 is mounted between the housing 1 and the electric motor 11, the weight distribution is well balanced, so that the actuator can be operated in a stable manner. Further, since the linear solenoid 43 is protected by the electric motor 11 and the housing 1, too, the protective cover 44 may be a simple one.

In FIG. 5, the engaging holes 41 serve as the pin-engaging portions. But different pin-engaging portions may be used, such as those shown in FIGS. 6(a)-8(b). The pin-engaging portions of FIGS. 6(a) and 6(b) are radial grooves 61 defined by a plurality of radially extending protrusions 60 formed on the intermediate gear 33.

Figure 7A:
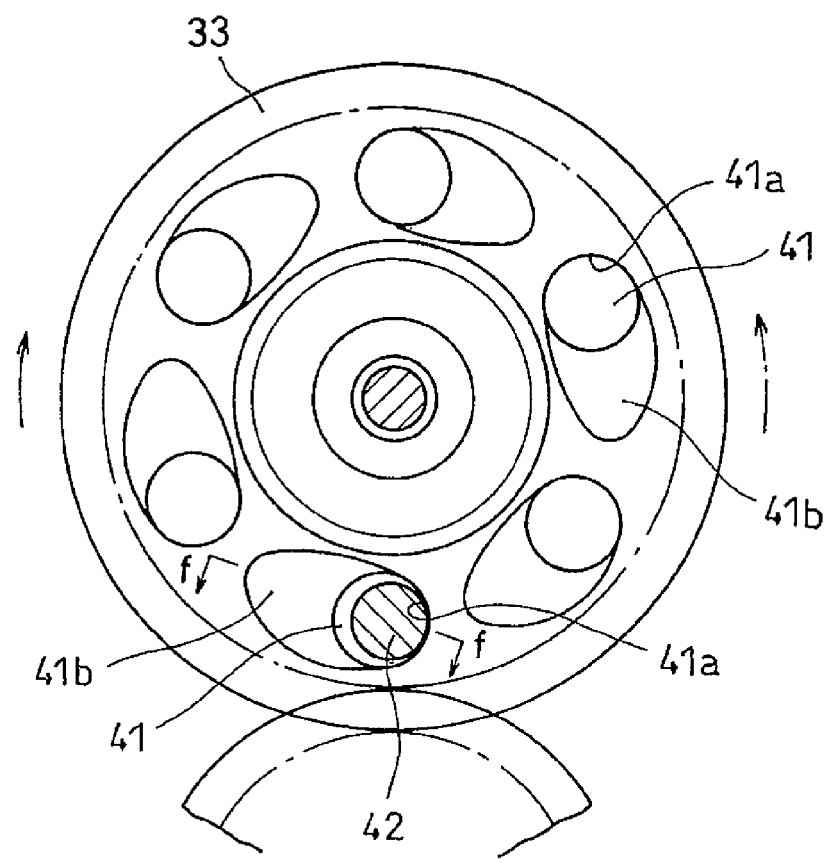
FIG. 7(a) is a sectional view of still different engaging portions.
Figure 7B:
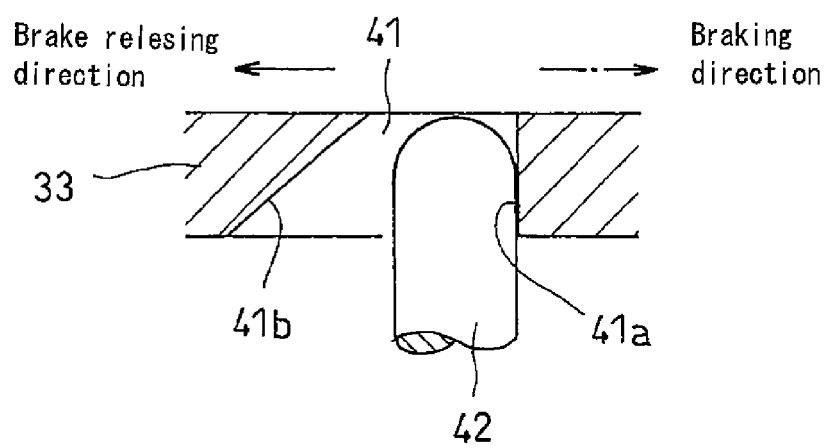
FIG. 7(b) is a sectional view taken along line f-f of FIG. 7(a).

The pin-engaging portions of FIGS. 7(a) and 7(b) are engaging holes 41 as in the example of FIGS. 5(a) and 5(b). The engaging holes 41 each have a locking surface 41a and a tapered surface 41b at one and the other circumferential ends thereof, respectively, such that when the locking pin 42 engages the locking surface 41a, the intermediate gear 33 is prevented from further rotating in the direction in which the brake is released, and when the intermediate gear 33 rotates in the direction in which the braking force increases, the locking pin 42 is pushed out of the engaging hole 41 guided by the tapered surface 41b.

By providing the tapered surface 41b at the other circumferential end of each engaging hole 41, the intermediate gear 33 can be smoothly rotated in the direction in which the braking force increases, which in turn makes it possible to reliably increase the braking force applied to the brake disk 51 to a value necessary to keep the vehicle parked in position.

Figure 6A:
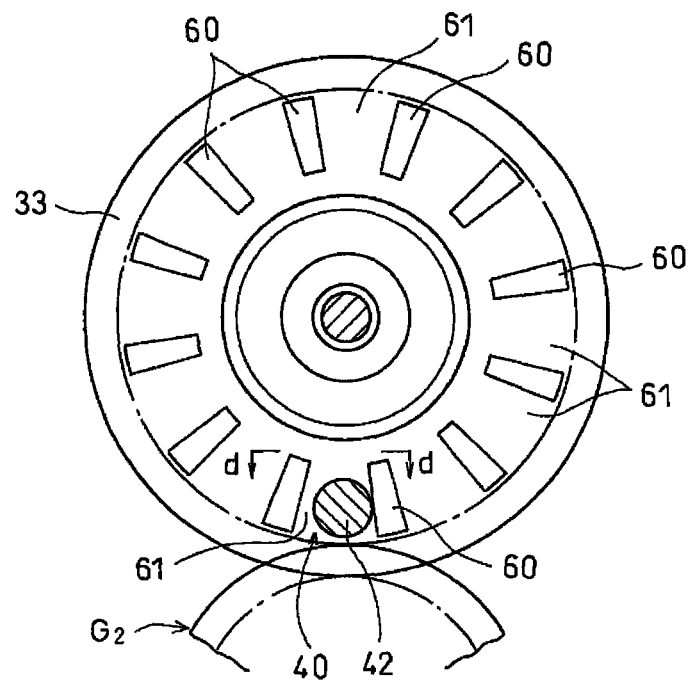
FIG. 6(a) is a sectional view of different engaging portions.
Figure 6B:
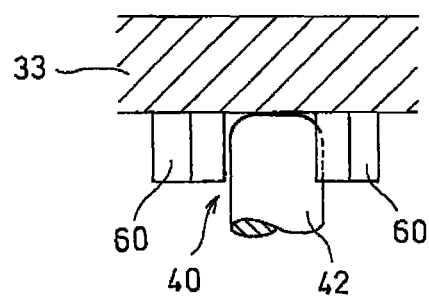
FIG. 6(b) is a sectional view taken along line d-d of FIG. 6(a).
Figure 8A:
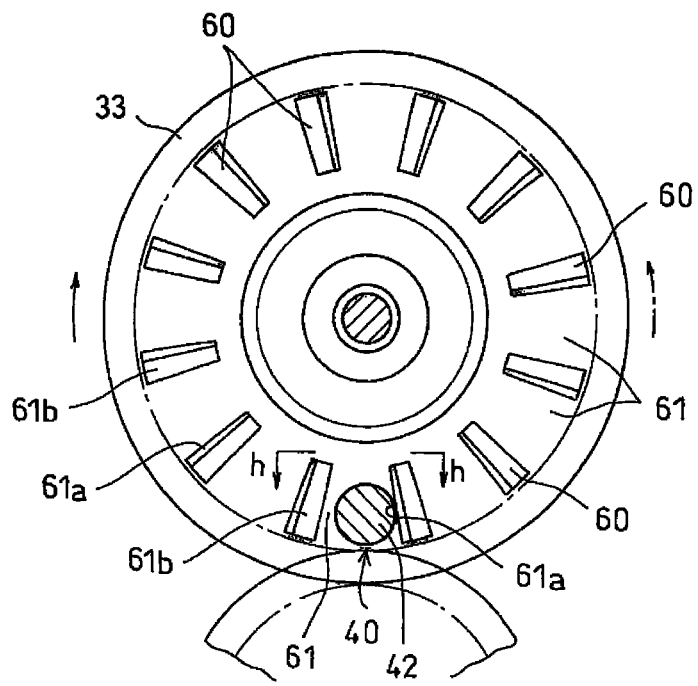
FIG. 8(a) is a sectional view of further different engaging portions.
Figure 8B:
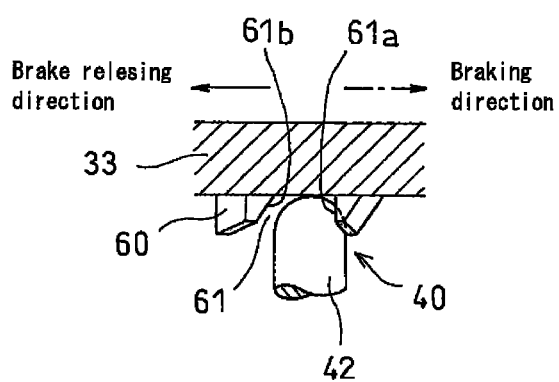
FIG. 8(b) is a sectional view taken along line h-h of FIG. 8(a).

The pin-engaging portions of FIGS. 8(a) and 8(b) are radial grooves 61 as in the example of FIGS. 6(a) and 6(b). The radial grooves 61 each have a locking surface 61a and a tapered surface 61b at one and the other circumferential sides thereof, respectively, such that when the locking pin 42 engages the locking surface 61a, the intermediate gear 33 is prevented from further rotating in the direction in which the brake is released, and when the intermediate gear 33 rotates in the direction in which the braking force increases, the locking pin 42 is pushed out of the radial groove 61 guided by the tapered surface 61b.

By providing the tapered surface 61b at the other circumferential side of each radial groove 61 as in FIGS. 8(a) and 8(b), the intermediate gear 33 can be smoothly rotated in the direction in which the braking force increases, which in turn makes it possible to reliably increase the braking force applied to the brake disk 51 to a value necessary to keep the vehicle parked in position, in the same manner as in FIGS. 7(a) and 7(b).

In the electric linear motion actuator shown in FIG. 1, in order to convert the rotary motion of the rotary shaft 10 to a linear motion, planetary rollers 23 are mounted between the radially outer surface of the rotary shaft 10 and the radially inner surface of the housing 1, and helical grooves 24 or circumferential grooves are formed in the radially outer surfaces of the respective planetary rollers 23 so as to be brought into engagement with the helical rib 6 formed on the radially inner surface of the outer ring member 5. But the mechanism for converting the rotary motion to a linear motion is not limited to this structure.

Figure 10:
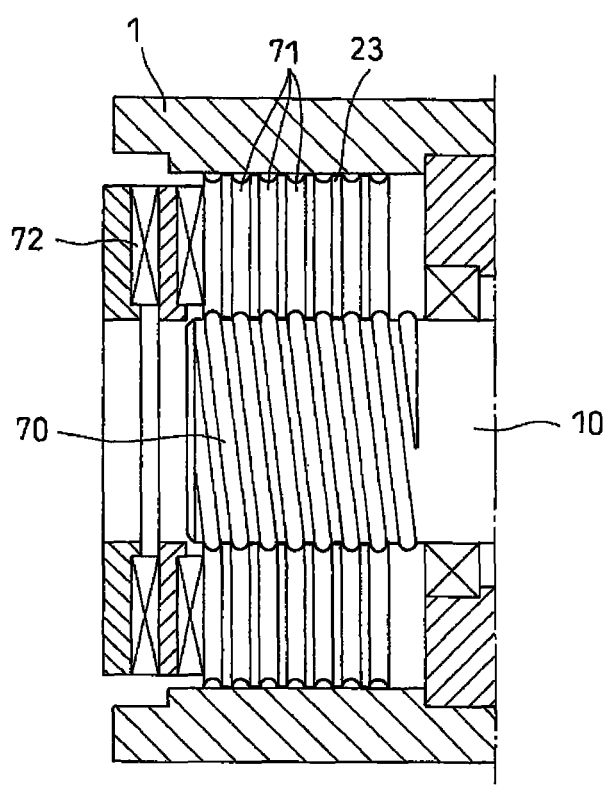
FIG. 10 is a sectional view of a different rotation-to-linear motion converting mechanism.

FIG. 10 shows a different rotation-to-linear-motion converting mechanism. In this example, a helical rib 70 is formed on the radially outer surface of the rotary shaft 10, and a plurality of circumferential grooves 71 are formed in the radially outer surface of each of a plurality of planetary rollers 23 mounted between the radially outer surface of the rotary shaft 10 and the radially inner surface of the housing 1 with the same pitch as the helical rib 70, whereby when the rotary shaft 10 rotates, the planetary rollers 23 revolve around the rotary shaft 10 while rotating about their respective own axes by the engagement between the helical rib 70 and the circumferential grooves 71, and simultaneously move in the axial direction, In this example, the axial force from the planetary rollers 23 is transmitted to the driven member through a thrust bearing 72.

What is claimed is:

1. An electric linear motion actuator comprising an electric motor having a rotor shaft, a reduction gear mechanism including an output gear having a center axis for reducing a rotation of the rotor shaft of the electric motor and outputting the thus reduced rotation at the output gear, a slide member movable in a direction of the center axis of the output gear, a rotation-to-linear-motion converting mechanism for converting a rotary motion of the output gear of the reduction gear mechanism to a linear motion and transmitting the linear motion to the slide member, and a locking mechanism capable of selectively rotationally locking and unlocking the rotor shaft of the electric motor, wherein the locking mechanism comprises a plurality of engaging portions provided on one side of one of a plurality of gears forming the reduction gear mechanism so as to be arranged in a circumferential direction of the one of the plurality of gears, a locking pin movable toward and away from the engaging portions and configured to be brought into engagement with any one of the engaging portions when moved toward the engaging portions, thereby locking the gears of the reduction gear mechanism, and a pin driving actuator for driving the locking pin between an advanced position and a retracted position, the pin driving actuator being mounted between the electric motor and a housing in which the slide member and the rotation-to-linear-motion converting mechanism are mounted, wherein the engaging portions are each formed with a locking surface provided at one circumferential end of the engaging portion and configured such that when the locking pin engages the locking surface, the locking surface prevents the one of the plurality of gears from rotating in a direction in which the slide member moves backward, and a tapered surface provided at another circumferential end of the engaging portion and configured such that when the one of the plurality of gears tends to rotate in a direction in which the slide member is advanced, the locking pin is allowed to separate from the engaging portion while sliding along the tapered surface.

2. The electric linear motion actuator of claim 1, wherein the engaging portions are provided on one side of a gear other than the output gear.

3. The electric linear motion actuator of claim 2, wherein the engaging portions are provided on a gear located close to an input gear mounted on the rotor shaft of the electric motor.

4. The electric linear motion actuator of claim 2, wherein the engaging portions are provided on an intermediate gear provided between the output gear and an input gear mounted on the rotor shaft of the electric motor.

5. The electric linear motion actuator of claim 1, wherein the engaging portions are engaging holes extending through the one of the plurality of gears.

6. The electric linear motion actuator of claim 1, wherein the engaging portions comprise radial grooves formed on the one side of the one of the plurality of gears.

7. The electric linear motion actuator of claim 1, wherein the pin-driving actuator comprises a linear solenoid.

8. The electric linear motion actuator of claim 1, wherein the locking mechanism further includes an elastic member biasing the locking pin toward the one of the plurality of gears.

9. The electric linear motion actuator of claim 1, wherein the rotation-to-linear-motion converting mechanism comprises a rotary shaft supporting the output gear of the reduction gear mechanism, said slide member, which comprises an outer ring member slidably supported by the housing so as to be coaxial with the rotary shaft, a carrier rotatable about the rotary shaft, and planetary rollers rotatably supported by the carrier between a radially outer surface of the rotary shaft and a radially inner surface of the outer ring member, wherein a helical groove or circumferential grooves are formed on a radially outer surface of each of the planetary rollers, wherein a helical rib is formed on the radially inner surface of the outer ring member which is engaged in the helical grooves or circumferential grooves of the planetary rollers, whereby the outer ring member as the slide member is moved in the direction of the center axis of the output gear when the planetary rollers rotate due to contact friction between the rotary shaft and the planetary rollers.

10. The electric linear motion actuator of claim 1, wherein the rotation-to-linear-motion converting mechanism comprises a rotary shaft supporting the output gear of the reduction gear mechanism and formed with a helical rib on a radially outer surface of the rotary shaft, said housing, which is a cylindrical member located coaxial with the rotary shaft, and said slide member, which comprises a plurality of planetary rollers mounted between a radially inner surface of the housing and the radially outer surface of the rotary shaft and each formed with circumferential grooves on a radially outer surface of the planetary roller with the same pitch as the helical rib of the rotary shaft, the helical rib being engaged in the circumferential grooves, whereby the rotation-to-linear-motion converting mechanism converts a rotary motion of the rotary shaft to a linear motion of the planetary rollers, as the slide member, due to engagement between the circumferential grooves and the helical rib.

11. An electric disk brake system comprising brake pads, a brake disk, and an electric linear motion actuator for linearly driving one of the brake pads, thereby pressing the brake pads against the brake disk, and imparting a braking force to the brake disk,
   wherein the electric linear motion actuator comprises the electric linear motion actuator of claim 1, and wherein the one of the brake pads is coupled to the slide member of the electric linear motion actuator.

* * * * *